Jan. 6, 1953     C. F. VOYTECH     2,624,600
DRIVE FOR SEALING WASHERS
Filed Nov. 19, 1947

INVENTOR
Charles F. Voytech
BY

Patented Jan. 6, 1953

2,624,600

UNITED STATES PATENT OFFICE 2,624,600

DRIVE FOR SEALING WASHERS

Charles F. Voytech, Chicago, Ill., assignor to Crane Packing Company, Chicago, Ill., a corporation of Illinois Application November 19, 1947, Serial No. 786,843

6 Claims. (Cl. 286—11.14)

This invention relates to mechanical seals and, particularly, to seals for shafts or the like passing through an opening in a housing wherein the seal is effected between radial surfaces on the shaft and housing.

Rotary mechanical seals are usually constructed in a manner to provide a seal between a hard washer having a low coefficient of friction, and a metallic surface, with means for effecting a flexible seal between the washer and one of the relatively rotatable elements to be sealed. Under certain conditions, for example, when the apparatus is idle for a long period of time, the washer may stick to the metallic surface and tend to be rotated with it. This, of course, introduces an unwanted torque upon the sealing element and is a frequent cause of rupture of the element with a consequent leak of the fluid to be confined.

The principal object of this invention is to provide a driving means for a washer of a rotary seal which is inexpensive to make and which does not require that the element to which the washer is secured be slotted, drilled, or otherwise machined to accommodate the drive.

Another object of this invention is to provide a friction coupling for the washer of a fluid seal, the coupling having a servo action such that the greater the torque imposed upon it the greater will be the tendency of the coupling to resist the torque.

Still another object of this invention is to provide a drive for the washer of a mechanical seal which will slip readily in an axial direction but which will grip tightly in a circumferential direction. This will permit the seal to be easily installed in the apparatus without the use of any special arbor presses.

Still another object of this invention is to provide a coil spring type of drive coupling for the washer of a rotary mechanical seal which is capable of holding the washer against relative rotation with respect to the element to which it is sealed in either direction of applied torque.

These and other objects of this invention will become apparent from the following detailed description when taken together with the accompanying drawings, in which Fig. 1 is a section through a rotary mechanical seal in which is installed a drive made in accordance with this invention;

Figure 1:
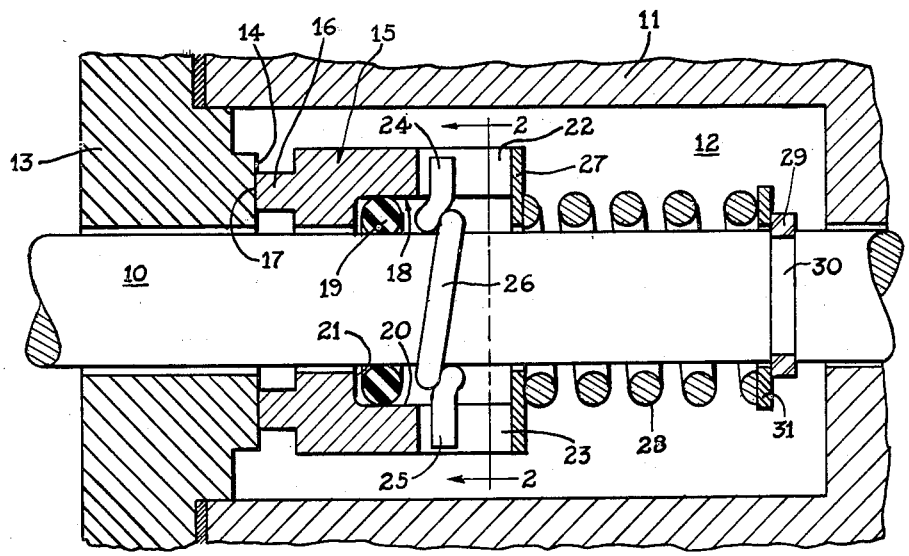

Referring now to the drawings for a detailed description of the invention and particularly to Fig. 1, there is shown at 10 a shaft which passes through a housing 11 of an apparatus adapted to contain a fluid, the fluid being present in a chamber 12 formed in the housing 11. An end cap 13 partially closes off chamber 12 and is formed with a raised face 14 suitably ground and finished as to be perfectly flat and smooth.

The seal for preventing the escape of fluid between end cap 13 and shaft 10 is comprised of a washer 15 which encircles shaft 10 and is free to move axially and to a small extent radially with respect to said shaft 10. Washer 15 is provided with a rib 16 having a face 17 contacting face 14 on end cap 13 and likewise suitably ground and lapped so as to be perfectly flat and smooth. Thus the running fit between surfaces 14 and 17 is such as to provide a fluid-tight joint between end cap 13 and washer 15 at all times.

Washer 15 is formed with an internal recess 18 in which is received an endless ring 19 of a resilient deformable material such as rubber, either natural or synthetic or a combination of the two. Ring 19 is preferably made with a circular radial cross-section, the diameter of which is slightly larger than the radial distance between the surface of shaft 10 and recess 18. Thus ring 19 is initially under compression and hence is adapted to provide a flexible, deformable seal between washer 15 and shaft 10 to permit the washer to move relative to the shaft without causing a leak. It will be noted that recess 18 is comprised of an inner cylindrical wall 20 and a substantially radially disposed wall 21, and that the recess is considerably longer in an axial direction than the thickness of ring 19.

Washer 15 at the right-hand side thereof as viewed in Fig. 1 is provided with slots 22 and 23 into which extend the ends 24 and 25, respectively, of a band 26 of resilient material such as spring wire or the like. Said band is wound with more than one turn, and preferably with one and one-half turns so that the radially extending ends are substantially balanced. If they were not so balanced a vibration would be set up as the shaft turned, which would be detrimental to the operation of both the seal and the apparatus as a whole. The internal diameter of the turn of the band 26 is initially smaller than the diameter of shaft 10 so that said band is sprung open slightly when installed upon a shaft. This insures an initial frictional contact between band 26 and shaft 10.

Figure 2:
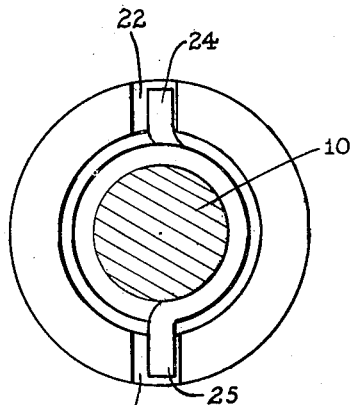
Fig. 2 is a section through the seal taken along line 2—2 of Fig. 1.
Figure 3:
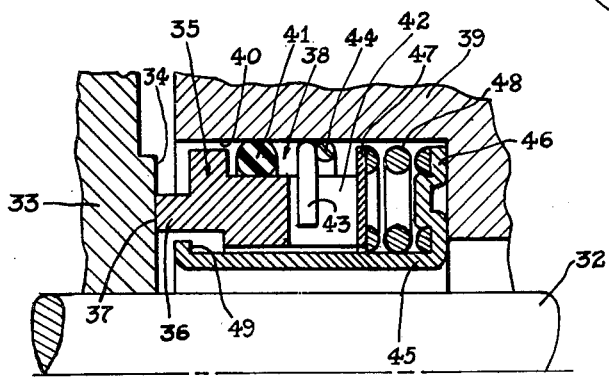
Fig. 3 is a partial quarter section through a seal showing the drive adapted for use where the seal is stationary instead of rotary as in Fig. 1.

Referring now to Fig. 2, it will be observed that the ends 24 and 25 of band 26 are not centrally located with respect to the slots 22 and 23 and that said ends 24 and 25 are disposed nearer the right-hand side of slots 22 and 23 as viewed in Fig. 3 than the left-hand side. This disposition of the ends 24 and 25 will cause one end to be contacted by washer 15 when the relative direction of torque is right-handed, as viewed in Fig. 2, and the other end to be contacted when the relative direction of torque is left-handed. Thus should washer 15 turn in a counter-clockwise direction as viewed in Fig. 2, end 24 will be contacted by the right-hand side of slot 22 but end 25 will be free of the washer, and because of the initial frictional contact between the band 26 and the shaft 10, the band will tend to wind up on the shaft and hence will increase the gripping effect between the band and shaft. This gripping effect increases with the torque impressed upon end 24. Likewise, when the direction of torque is clockwise as viewed in Fig. 2, end 25 will be contacted by the washer and end 24 will be free. Because of the initial frictional contact between band and shaft, this action will again result in a gripping effect between the band and shaft which will increase with increase in torque impressed upon end 25.

Thus, it will be observed that band 26 will be effective to prevent relative rotation between washer 15 and shaft 10 and that a servo action will result due to the above-described relationship between the ends 24 and 25 of the band and the slots 22 and 23. The band, however, may be readily moved axially along shaft 10 so that the installation of the band on the shaft can be accomplished without the aid of special machinery such as arbor presses or the like.

The remainder of the seal is comprised of a washer 27 abutting on the end of sealing washer 15 and serving to transmit the pressure of a spring 28 to said washer to hold the washer against surface 14 on end cap 13. Said spring 28 may be held by a snap ring 29 retained in a groove 30 in shaft 10, with a rigid washer 31 interposed between the end of spring 28 and snap ring 29.

It is understood that the deformable resilient sealing element 19 may take other forms and that the form of this sealing element therefore is not material to the operation of this invention.

The washer drive described with reference to Figs. 1 and 2 may be adapted to a rotary mechanical seal wherein the washer is sealed with respect to the housing instead of to the shaft. Such an adaptation is shown in Fig. 3 to which reference is now made. In Fig. 3 there is shown a shaft 32 to which is secured an abutment 33 with a fluid-tight fit, said abutment 33 having a raised face 34 suitably ground and lapped to form a perfectly flat, smooth sealing surface. Adjacent surface 34 is disposed a washer 35 having an axially extending annular rib 36, the end surface 37 of which is ground and lapped to form a perfectly flat and smooth surface capable of forming a fluid-tight running fit with surface 34.

Said washer 35 is disposed in a recess 38 in a housing 39 through which shaft 32 passes. Said recess has an inner cylindrical wall 40 spaced from washer 35 and a resilient deformable ring 41 of rubber, either synthetic or natural or a combination of the two, is compressed between washer 35 and the cylindrical wall 40. Ring 41 is similar to ring 19 of Fig. 1 in that it is endless and is preferably made with a circular radial cross-section commonly known as an O ring. Since the ring is initially under compression, it will effect a fluid-tight seal between washer 35 and O ring 39 and at the same time will permit the washer to move axially and to a limited extent radially in the recess 38.

Washer 35 is slotted as at 42 to receive the end 43 of a band 44 of resilient material such as spring wire. Said band 44 may have one or more turns and the ends thereof need not be symmetrically arranged with respect to a diameter inasmuch as band 44 does not rotate and hence need not be balanced. It is understood however that the opposite end of the band is likewise turned radially inwardly after the fashion of end 43 and engages a similar slot (not shown). The relationship between the disposition of the ends of the band and the slots is identical with that shown in Fig. 2 so that despite the direction of torque applied to washer 35 by surface 34, band 44 will tend to expand against inner cylindrical wall 40 of recess 38 and increase the gripping effect. It will be noted that in the form shown in Fig 3, the band is made to expand, whereas in the form shown in Figs. 1 and 2, the band is made to contract in order to secure the increased gripping effect.

Washer 35 is mounted over a retainer 45 having a radially disposed flange 46 spaced from the right-hand end (Fig. 3) of washer 35. A rigid washer 47 abuts on the said end of washer 35 and a plurality of springs 48 is compressed between flange 46 and washer 47 so as to urge sealing washer 35 constantly against surface 34 on abutment 33. A flange 49 may be turned up on the opposite end of retainer 45 to prevent washer 35 from leaving the retainer under the action of springs 48.

In both the Fig. 1 and Fig. 3 forms, the bands 26 and 44 do not prevent their respective washers from moving axially under the action of the springs provided for this purpose even though a fairly large amount of torque may be transmitted from the washer to the band at the time.

It is understood that the foregoing description is merely illustrative of preferred embodiments of this invention and that the scope of the invention is not to be determined thereby, but by the appended claims.

What is claimed is:

1. A fluid seal for relatively rotatable elements having a sealing washer, means for effecting a fluid-tight seal between the washer and one of the relatively rotatable elements, means for urging the washer toward the other of the elements, and means for preventing relative rotation between the washer and said one element, said last-mentioned means comprising a torque-responsive coupling having three parts, two of which are mutually exclusively connected to the washer with a positive drive and the third part frictionally engaging the said one relatively rotatable element.

2. A fluid seal as described in claim 1, wherein the torque-responsive coupling is comprised of a radially expansible and contractible band frictionally engaging said one element and positively engaging the washer.

3. A fluid seal as described in claim 1, wherein the torque-responsive coupling is comprised of a radially expansible and contractile resilient band of substantially one and one-half turns, the washer having slots, and the ends of the band extending into the slots to form a positive connection therebetween.

4. A fluid seal as described in claim 1, wherein the washer has a recess in which the resilient sealing element and the driving means are retained and axially aligned.

5. A fluid seal as described in claim 1, wherein the washer is formed with slots and the torque-responsive coupling is comprised of a radially expansible and contractile resilient band of substantially one and one-half turns, the slots in the washer being wider circumferentially than the circumferential thickness of the ends of the band, and the ends of the band extending into the slots and contacting one of the edges of the slots located on the same side of a diameter in either direction of rotation of the said one element.

6. In a fluid seal device for effecting a seal between a shaft and a housing therefor, a washer encircling the shaft and freely movable axially thereon, the housing having a recess adapted to receive the washer, a resilient deformable sealing ring compressed between the washer and the cylindrical wall of the recess, there being a pair of circumferentially spaced slots in the washer, a resilient band having more than one turn in contact with the cylindrical wall of the recess and having each end extending into one of the slots, the said slots being of greater circumferential extent than the thickness of the band ends, the distance between said band ends measured circumferentially around the washer being greater than the circumferential distance between said slots whereby only one end of said band will contact the washer in either direction of rotation of the washer and the band being coiled in a manner to expand into the recess when the said one end is driven by the washer.

CHARLES F. VOYTECH.

REFERENCES CITED

The following references are of record in the file of this patent:

UNITED STATES PATENTS

| Number | Name | Date |
|---|---|---|
| 1,295,974 | Dron et al. | Mar. 4, 1919 |
| 2,140,304 | Wishart | Dec. 13, 1938 |
| 2,429,953 | Bottomley | Oct. 28, 1947 |

FOREIGN PATENTS

| Number | Country | Date |
|---|---|---|
| 601,970 | Germany | of 1934 |